United States Patent
Cartwright et al.

(10) Patent No.: US 9,876,913 B2
(45) Date of Patent: Jan. 23, 2018

(54) PERCEPTUAL CONTINUITY USING CHANGE BLINDNESS IN CONFERENCING

(71) Applicant: Dolby Laboratories Licensing Corporation, San Francisco, CA (US)

(72) Inventors: Richard J. Cartwright, Killara (AU); Glenn N. Dickins, Como (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/121,859

(22) PCT Filed: Feb. 17, 2015

(86) PCT No.: PCT/US2015/016100
§ 371 (c)(1),
(2) Date: Aug. 26, 2016

(87) PCT Pub. No.: WO2015/130509
PCT Pub. Date: Sep. 3, 2015

(65) Prior Publication Data
US 2017/0078488 A1 Mar. 16, 2017

Related U.S. Application Data

(60) Provisional application No. 61/946,030, filed on Feb. 28, 2014.

(51) Int. Cl.
*H04M 3/56* (2006.01)
*G10L 15/08* (2006.01)
(Continued)

(52) U.S. Cl.
CPC ............ *H04M 3/568* (2013.01); *G10L 15/08* (2013.01); *G10L 21/02* (2013.01); *G10L 25/78* (2013.01);
(Continued)

(58) Field of Classification Search
CPC ...... G10K 11/175; G10K 15/02; H04M 3/568; H04M 3/563; H04R 25/75; H04R 25/43; H04W 52/0229; G10L 25/78; G10L 15/08
See application file for complete search history.

(56) References Cited

U.S. PATENT DOCUMENTS 6,570,606 B1   5/2003   Sidhu
6,650,745 B1   11/2003  Bauer
(Continued)

FOREIGN PATENT DOCUMENTS

CN   1810015   7/2006
CN   1859511   11/2006
(Continued)

OTHER PUBLICATIONS

Cherry, E. Colin "Some Experiments on the Recognition of Speech, with One and with Two Ears" The Journal of the Acoustical Society of America, vol. 25, No. 5, Sep. 1953, pp. 975-979.
(Continued)

*Primary Examiner* — Daniel Lai (57) ABSTRACT

In an audio conferencing mixing system of the type taking a plurality of audio input streams of input audio information of conference participants, including mixing transition events and outputting a plurality of audio output streams including output audio information, a method of mixing the audio output streams so as to reduce the detectability of the mixing transition events, the method including the steps of (a) determining that a transition event is to occur; (b) determining that a masking trigger is to occur; (c) scheduling the transition event to substantially occur when the masking event occurs. Change blindness mechanism to mask changes in audio conference mix and maintain perceptual continuity.

9 Claims, 6 Drawing Sheets (51) Int. Cl.
*G10L 21/02* (2013.01)
*G10L 25/78* (2013.01)
*H04W 52/02* (2009.01)
*H04R 3/00* (2006.01)
*G10L 25/87* (2013.01)

(52) U.S. Cl.
CPC ....... *H04M 3/563* (2013.01); *H04W 52/0229* (2013.01); *G10L 25/87* (2013.01); *H04M 2201/14* (2013.01); *H04R 3/005* (2013.01); *H04R 2420/01* (2013.01)

(56) References Cited

U.S. PATENT DOCUMENTS

| | | | |
|---|---|---|---|
| 6,850,496 | B1 | 2/2005 | Knappe |
| 6,976,055 | B1 | 12/2005 | Shaffer |
| 7,006,616 | B1 | 2/2006 | Christofferson |
| 7,298,834 | B1 | 11/2007 | Homeier |
| 7,599,834 | B2 | 10/2009 | Raad |
| 7,849,138 | B2 | 12/2010 | Gu |
| 8,070,601 | B2 | 12/2011 | Acharya |
| 8,073,125 | B2 | 12/2011 | Zhang |
| 8,218,460 | B2 | 7/2012 | Laaksonen |
| 8,255,206 | B2 | 8/2012 | Ito |
| 8,265,252 | B2 | 9/2012 | Ducheneaut |
| 8,270,587 | B2 | 9/2012 | Noldus |
| 2005/0122389 | A1 | 6/2005 | Miao |
| 2007/0263824 | A1 | 11/2007 | Bangalore |
| 2008/0159507 | A1 | 7/2008 | Virolainen |
| 2008/0252637 | A1 | 10/2008 | Berndt |
| 2009/0316870 | A1* | 12/2009 | Wise ........................ H04M 3/56 379/202.01 |
| 2010/0020954 | A1 | 1/2010 | Gilg |
| 2011/0038362 | A1* | 2/2011 | Vos ........................ G10L 19/012 370/352 |
| 2012/0106753 | A1* | 5/2012 | Theverapperuma ... H04R 3/005 381/92 |
| 2014/0278380 | A1 | 9/2014 | Gunawan |
| 2015/0221319 | A1 | 8/2015 | Cartwright |
| 2015/0244868 | A1 | 8/2015 | Cartwright |
| 2016/0027447 | A1 | 1/2016 | Dickins |

FOREIGN PATENT DOCUMENTS

| | | |
|---|---|---|
| CN | 102789782 | 11/2012 |
| CN | 103415884 | 11/2013 |
| EP | 1855455 | 11/2007 |
| JP | 2008-034979 | 2/2008 |
| JP | 2008-141505 | 6/2008 |
| JP | 2012-146072 | 8/2012 |
| WO | 2013/186343 | 12/2013 |

OTHER PUBLICATIONS

Simon, DJ et al "How not to be seen: the contribution of Similarity and Selective Ignoring to Sustained Inattentional Blindness" Psychol Sci 12, Jan. 2001.
Bregman, Albert S. "Auditory Scene Analysis" MIT Press, Cambridge, May 1990.
Chandra, S.P. et al "Audio Mixer for Multi-Party Conferencing in VoIP" IEEE International Conference on Internet Multimedia Services Architecture and Applications, Dec. 9-11, 2009, pp. 1-6.
Lee, Kwan H. et al "Cocktail Party on the Mobile" IEEE International Symposium on Multimedia, Dec. 15-17, 2008, pp. 440-445.
Shinn-Cunningham, B. et al "Influences of Perceptual Continuity on Everyday Listening" J. Acoust. Soc. Am. 133, Jun. 2-7, 2013, v. 19.

* cited by examiner

FIG. 6C

PERCEPTUAL CONTINUITY USING CHANGE BLINDNESS IN CONFERENCING

CROSS-REFERENCE TO RELATED APPLICATIONS

This application claims the benefit of priority to U.S. Provisional Patent Application No. 61/946,030 filed 28 Feb. 2014, which is hereby incorporated by reference in its entirety.

FIELD OF THE INVENTION

The present invention relates to the field of audio teleconferencing, and, in particular, discloses the utilisation of change blindness mechanisms to mask changes in teleconferencing.

BACKGROUND OF THE INVENTION

Any discussion of the background art throughout the specification should in no way be considered as an admission that such art is widely known or forms part of common general knowledge in the field.

Video and audio teleconferencing systems where multiple parties interact remotely to carry out a conference are an important resource.

Many systems are known. Most rely on a central or distributed server resource to ensure each participant is able to hear and/or see the other participants using, for example, dedicated teleconferencing devices, standard computer resources with audio/input output facilities or Smart Phone type devices. The distributed server resource is responsible for appropriately mixing uplinked audio signals together from each conference participant and downlink the audio signals for playback by each audio output device.

By way of background, in a typical (known) teleconferencing system a mixer receives a respective 'uplink stream' from each of the telephone endpoints, which carries an audio signal captured by that telephone endpoint, and sends a respective 'downlink stream' to each of the telephone endpoints. Thus each telephone endpoint receives a downlink stream which is able to carry a mixture of the respective audio signals captured by the other telephone endpoints. Accordingly, when two or more participants in a telephone conference speak at the same time, the other participant(s) can hear both participants speaking.

It is known (and usually desirable) for the mixer to employ an adaptive approach whereby it changes the mixing in response to perceiving certain variations in one or more of the audio signals. For example, an audio signal may be omitted from the mixture in response to determining that it contains no speech (i.e. only background noise). But changing the mixing at the wrong time may lead to disconcerting artefacts being heard by the participants.

SUMMARY OF THE INVENTION

Various methods, devices, apparatus and systems disclosed herein may provide an improved form of audio conferencing mixing.

In accordance with a first aspect of the present disclosure, there is provided in an audio conferencing mixing system of the type taking a plurality of audio input streams of input audio information of conference participants, including mixing transition events and outputting a plurality of audio output streams including output audio information, a method of mixing the audio output streams so as to reduce the detectability of the mixing transition events, the method including the steps of: (a) determining that a transition event is to occur; (b) determining that a masking trigger is to occur; (c) scheduling the transition event to substantially occur when the masking event occurs.

The mixing transition events can include changes in the audio input stream encoding which would be noticeable to a listening participant when listening in isolation.

Preferably, the masking trigger can include at least one of: the onset or cessation of speech; a predetermined change in speech characteristics, or the onset of simultaneous speech by a predetermined number of participants. The scheduling can comprise delaying the occurrence of the transition event until the masking trigger occurs.

In some embodiments, the masking trigger can comprise the utterance of predetermined text by at least one of the conference participants. In some embodiments, the presence of an increase in volume and/or predetermined spectral flux in one of the audio input streams can be indicative of a masking trigger in the one of the audio input streams. The onset or cessation of speech can be denoted by a change in value of a voice activity flag in one of the audio input streams. In some embodiments, the masking event can be determined by an auditory scene analysis of the series of audio input streams.

The audio input streams can include at least one CTX (continuous transmission) audio input stream and at least one DTX (discrete transmission) audio input stream.

In accordance with a further aspect of the present disclosure, there is provided an audio mixing system including: a plurality of audio stream input units receiving audio input uplink streams from a plurality of audio input/output devices, the audio input uplink signals including transition event signals of changes in the audio uplink streams that would be noticeable to a listening participant when listening in isolation and masking trigger signals denoting predetermined audio events in the audio input uplink streams; and a series of audio submixing units each forming a downlink output for return to a respective one of the plurality of audio input/output devices, each of the audio submixing units being interconnected to predetermined ones of the audio stream input units for mixing the audio input uplink streams in relation thereto, the audio submixing units further comprising: a first control unit for controlling the form of mixing of inputted audio streams, and altering the form of mixing in response to the transition event signals; a second control unit for delaying the alteration of the form of mixing until such time as a masking trigger signal is present in at least one of the audio input uplink streams.

Various embodiments disclosed herein may have particular application where the system and server is able to integrate spatial and/or more continuous audio signals into the mixer and the presented scene. Specifically, the embodiments may be of use where there is a desire for scalability and therefore lower computational complexity and/or bandwidth usage. The embodiments may also of value in the absence of system constraints, where the use is primarily to achieve a degree of perceptual scene complexity reduction, which must also occur by changing the presence and contribution of different participant audio signals to the mix. Furthermore, there is a case for using such a system where the actions and changes to presented scenes are due to incoming control signals from other factors or user control input. In such cases, the use of the embodiments may lessen the impact of activities such as sound stream or object termination, level adjustment, changes to spatial render properties, changes to processing, or any other change that would normally result in a sudden change to a perceived property of the audio stream that would be unexpected and therefore problematic for achieving the goal of perceptual continuity.

BRIEF DESCRIPTION OF THE DRAWINGS

Exemplary embodiments will now be described, by way of example only, with reference to the accompanying drawings in which.

DETAILED DESCRIPTION

The preferred embodiment operates in an environment for audio teleconferencing (with or without an associated video stream).

Figure 1:
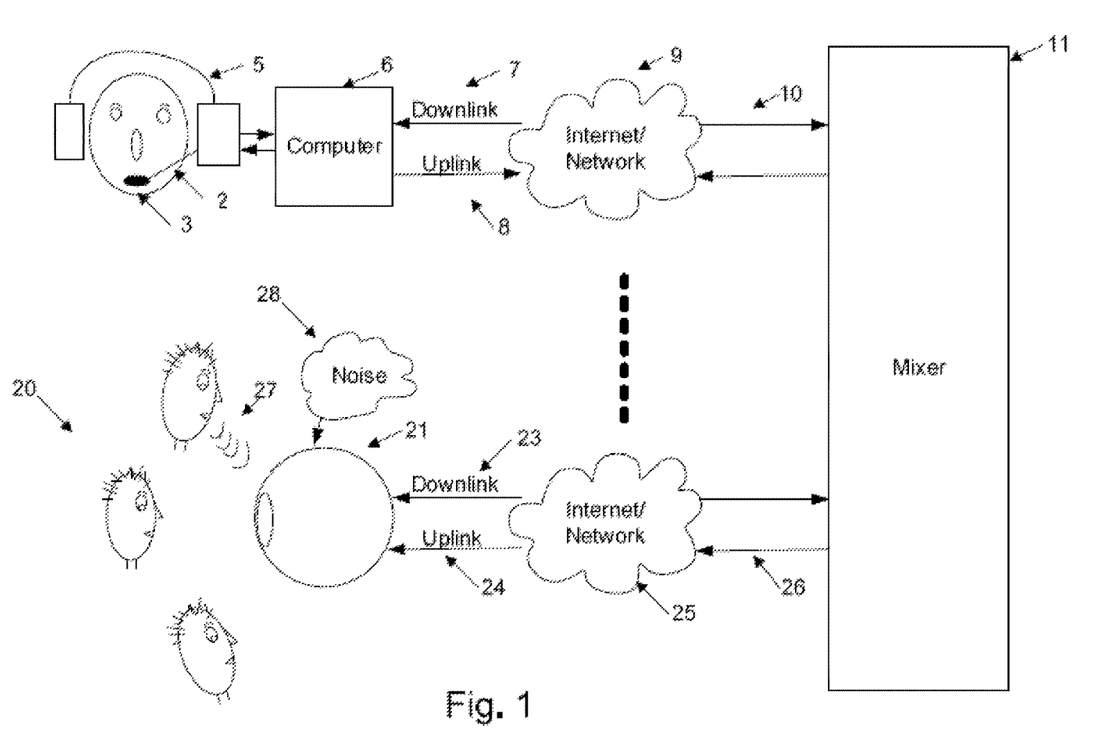
FIG. 1 illustrates schematically one form of adaptive mixing arrangement of the preferred embodiment.

An exemplary audio teleconferencing system is illustrated 1 in FIG. 1. In this arrangement a series of conference participants collectively provide audio input and output. For example, in the arrangement 1, a first participant 2 uses a pair of headphones 5 and input microphone 3 interconnected to computer 6 for conference participation. The computer 6 provides uplink 8 and downlink 7 connections over a network 9, with mixer 11.

A second group of participants e.g. 20 use an audio device 21 which provides audio output including spatialization information. The audio device 21 also provides internal computational and communication abilities and includes uplink 23 and downlink 24 channels which interconnect via network 25, 26 with mixer 11. Additional participants can also be interconnected to the mixer via other means.

The arrangement of FIG. 1 includes a plurality of conference participants 2 utilising DTX endpoints, exemplified by the binaural headset 5 with boom microphone 3. Each of said plurality of DTX endpoints asserts 10 a DTX uplink stream 8 to the teleconferencing mixer 11, typically via a network 9. The mixer produces a downlink stream 7 for each DTX endpoint, which is transmitted back to the endpoint 2 over the network 9 to be heard by the participant 2.

Each of a plurality of CTX endpoints, exemplified by speakerphone device 21, captures the speech 27 of a further plurality of conference participants 20. Non-trivial background noise may also be captured by such devices. Each of the said plurality of CTX endpoints asserts a CTX uplink stream 26 to the mixer 11, typically via a network 25. Without loss of generality, network 25 may be the same network as that used by the DTX endpoints. The mixer 11 produces a downlink stream 23 for each CTX endpoint, which is transmitted back to the endpoint 21 over the network 25 for playback to a plurality of participants 20.

In the teleconferencing system, each of the participant endpoints send an uplink audio stream to a teleconferencing mixer and receives a downlink stream therefrom. In such a system, the uplinks and downlinks may be encoded digitally and transmitted via a suitable packet-switched network, such as a voice over internet protocol (VoIP) network, or they may travel over a circuit-switched network, such as the public switched telephone network (PSTN). Either way, it is the mixer's 11 responsibility to produce a downlink audio stream to send back to each endpoint such that, in general, each participant hears every other participant except himself.

One class of endpoint in such a system employs discontinuous transmission (DTX) on the uplink. Such an endpoint attempts to maximise intelligibility while minimising the use of network resources by one of more of: employing microphone placements close to the talkers' mouths; noise suppression signal processing which remove background noise; only sending the uplink stream when human speech is present.

This strategy can result in less aberrant noise being heard by the listener, but it can also result in a less natural-sounding experience, firstly because noise suppression signal processing typically results in the introduction of disturbing dynamic artefacts when the background noise is non-stationary, secondly because the noise suppression affects the equalisation of the speech and thirdly because the binary transmit/don't transmit decision, based on imperfect information from an associated voice activity detector (VAD), will sometimes lead to speech being cut off and at other times lead to residual noise being transmitted as speech.

A second class of endpoint employs continuous transmission (CTX) on the uplink. That is, they send an audio stream regardless of whether the VAD (if present) determines that speech is present or not. Here the intention is often to maximise the naturalness of the listening experience and allow a remote listener to perform aspects of speech localisation or spatialization, just as if he or she were present in person. Accordingly, a CTX device may employ multiple microphones to retain spatial diversity to allow binaural release from masking. The designer of a CTX device may also seek to limit the amount of noise suppression processing that the device performs in order to minimise the potential for disturbing dynamic artefacts and spectral colouration.

Generally, a DTX device seeks to remove, suppress or otherwise avoid transmitting anything it deems not to constitute human speech, whereas a CTX device seeks to be transparent, transmitting everything using the most perceptually continuously and relevantly manner possible.

It is important to bear these intents in mind when designing a teleconferencing mixer. Since a DTX endpoint's uplink is substantially silent when no speech is detected, a mixer 11 may be able to freely discard its uplink stream when speech is not detected without perceptual consequence for the listener. However, when forming a downlink mix that contains a CTX stream, the mixer must be careful in how it applies mixing transitions to the stream. For example, discarding a CTX stream when talk is not detected may be readily noticed by a listener because the background noise associated with that stream may be heard to turn off, especially if no other CTX stream is present to mask the transition. The listener may be left wondering whether the system has failed, or whether the CTX endpoint has disconnected from the conference. The goal of providing a natural listening experience would not be met in such a case.

Generally, the goal of a teleconferencing mixer 11 is to allow each participant to hear the speech from every other participant, but not from himself. There are, however, some nuances to this goal. For example, if many CTX streams, each containing background noise, are heard simultaneously by a listener, the total background noise power heard may increase to a point where it is distracting or detrimental to intelligibility. Consider as a further example where multiple uplink streams all talking at the same time. The result may be too cacophonous to facilitate useful communication. It may be better to let only the two or three most perceptually relevant streams through in this case. Many authors, including the present authors, have proposed methods for achieving this. For example, European Patent Publication No. EP 1 855 455 to Enbom, et al. discloses one such methodology and International Patent Application No. PCT/US2013/061658 filed 25 Sep. 2013, also discloses a second way of achieving this.

In addition, from the ability to simply allow or mute an uplink in a downlink mix dynamically, a teleconferencing mixer 11 may furthermore be able to affect other kinds of mixing transitions. For example, it may be able to lower the coding bitrate or audio fidelity of an uplink stream in a downlink mix, or (when the uplink contains spatial diversity from multiple microphones) it may be able to adjust the spatial fidelity with which an uplink stream is heard in a downlink mix. If the downlink is presented to the listener using a spatial audio system, such as one that renders over an array or speakers or performs virtualisation over headphones using head-related transfer functions (HRTFs) or the like, the mixer may furthermore be able to affect the perceived position or region in space from which a stream appears to the listener to emanate.

Regardless of exactly which mixing transitions are available to a mixer in a particular teleconferencing system, the mixer may make such transitions dynamically, based on the behaviour of the participants and endpoints in the conference and some types of transitions may be noticeable or disconcerting to a listener when applied carelessly. The preferred embodiments include a novel class of methods for handling mixing transitions at a teleconferencing server in such a way that the transition is not readily noticeable by a listener, thereby preserving perceptual continuity and naturalness in the listening experience. To do so, use is made of the phenomenon of selective attention in human auditory scene analysis.

The example of the phenomenon of selective attention can perhaps be most immediately understood by analogy to the concepts of change blindness or inattentional blindness in visual perception studies. For example, inattentional blindness is well illustrated by Simons' and Chablis' famous "invisible gorilla" experiment (Most, S B; Simons, D J; Scholl, B J; Jimenez, R; Clifford, E; Chabris, C F (January 2001). "How not to be seen: the contribution of similarity and selective ignoring to sustained inattentional blindness". *Psychol Sci* 12 (1): 9-17. doi:10.1111/1467-9280.00303. PMID 11294235. (see also www.invisiblegorilla.com), in which viewers of a video of a basketball match, when told to count the number of times the ball is passed, fail to notice a person in a gorilla suit walk into the centre of the screen and wave. The would-be gorilla is highly visible and would in other circumstances be immediately noticed, but often escapes the viewer's notice completely because their attention is diverted elsewhere.

In the preferred embodiment, a method of making mixing transitions in a teleconferencing mixer is provided that would otherwise be immediately noticed, but which go unnoticed because they are synchronised to coincide with some other events which captures the listener's attention—for example, the joining of a new participant to the conference or the onset of speech from a participant who has not talked for some time.

The preferred embodiment thereby provides a class of methods for improving the perceived continuity in a downlink audio stream, making use of the concepts of selective attention and change blindness. Each method of the class can be implemented in a teleconferencing mixer. In some embodiments the teleconferencing mixer may reside in one or more central servers. In other embodiments the teleconferencing mixer may reside in one or more of the endpoints.

As is known in the art of teleconferencing facilities, for each conference hosted by the mixer 11, an uplink streams is received from each endpoint. The mixer produces a downlink stream for each endpoint. Without loss of generality, examples of mixing techniques a mixer may employ to form a downlink stream from a plurality of uplink streams include:

Mixing: Decoding, or partially decoding, uplink streams, summing together the decoded, or partially decoded, audio signals and reencoding a downlink stream.

Transcoding: Decoding an uplink and reencoding to form a component of a downlink.

Forwarding: Copying all or part of the encoded information in an uplink stream into a downlink stream.

Metadata adjustment: Adding, removing or modifying metadata associated with an uplink stream so as to alter the manner in which it will be rendered to the participants listening at the downlink endpoint.

From time to time, the mixer performs transitions when mixing a particular downlink stream. A transition is any change to the downlink audio stream which would be audible and noticeable to a listening participant at a downlink endpoint if affected in isolation (that is without any masking event). Without loss of generality, examples of mixing transitions include: Turning on or off or fading in or out an uplink stream in a mixed downlink stream; Beginning or ceasing forwarding of an uplink stream as a component of a downlink stream; Changing the spatial fidelity or representation of an uplink stream in a downlink stream; Changing the audio quality (for example, by means of adjusting the coding bitrate) of an uplink stream as a component of a downlink stream; Changing the perceived position of a uplink stream in a downlink stream's spatial scene, when the downlink is capable of spatial or positional audio rendering; Dropping or raising the gain of a particular uplink stream in a downlink mix by a step change; Switching or crossfading from the actual uplink audio stream to a synthetically generated noise field designed to be spectrally and (where applicable) spatially similar to the noise present in the uplink stream.

The mixer performs one or more transitions in response to a trigger. A trigger is an event derived from the state of the conference. Without loss of generality, examples of triggers include: 1) A VAD flag on an uplink stream signalling the onset, or cessation of speech on that uplink. The VAD may be implemented in the sending client with the result included in metadata in the uplink stream. Alternatively, the VAD may be implemented in the mixer and make its speech presence determination based on the encoded or decoded audio included in the uplink stream; 2) A heuristic derived from VAD information. For example, if a verbosity metric is employed by the mixer and crosses below a threshold for a certain uplink endpoint, a fade-out transition can be triggered on a downlink; 3) The onset or cessation of talkburst transition from an endpoint with a DTX uplink; 4) A maximum number of simultaneous talkers is exceeded.

Different forms of characterisation of the verbosity metric or heuristic can be used, including simple measures such as power spectrum analysis of each channel. One more complex measure of verbosity is obtained in International Patent Application No. PCT/US2013/061658 filed 25 Sep. 2013, the contents of which are hereby incorporated by cross reference.

Upon assertion of a trigger, a key aspect of the preferred embodiment is that the mixer waits until a suitable masking event occurs before applying any transition that results from that trigger. A masking event is any event that may capture a listener's attention or otherwise mask a transition. Without loss of generality, examples of masking events include: 1) A VAD on an uplink stream signalling the onset, or cessation of speech on that uplink. The onset of speech on a particular uplink may be especially valuable as a masking event if speech hasn't been present on that uplink for some time. Therefore, onset events may be graded or gated based on length of time since last speech was detected on the uplink. 2) The presence of particular syllables, words or classes of speech as determined by a speech recognition or other classification algorithm implemented on the uplink endpoint (with the result embedded in the uplink stream) or on the mixer. 3) Jumps in the volume level, spectral flux, or other such heuristics based on the audio available in the uplink stream, or based on the microphone signal from which it was derived. 4) Events signalled using existing auditory scene analysis-based techniques such as those employed in products such as Dolby Volume and as outlined in U.S. Pat. No. 8,396,574 and U.S. Pat. No. 8,428,270.

In one class of embodiments, the masking events are binary. That is, an event either is, or is not, present. A pending transition will simply be made upon assertion of a masking event. In a second class of embodiments, events can be graded according to an event magnitude, which is an estimate of how effectively the event will capture a listener's attention. This magnitude is used to control how a transition is made. For example, a large magnitude event might cause a fade transition to occur over a short period of time, while a small magnitude event might cause a fade transition to occur over a long period of time. Consider, as a further example, a mixer that wants to attenuate an uplink in a downlink mix in a series of step gain-change transitions as the result of a trigger. In this case, the amount of attenuation applied in each transition could be a function of the corresponding event magnitude.

Without loss of generality, examples of properties upon which an event magnitude could be based include: the volume level of speech in an uplink; the volume level at the onset of speech in a talkburst; the magnitude of an event in a Dolby Volume-style event detector; the confidence that a particular word, syllable or phrase has been detected in an uplink stream; and the time elapsed at the start of a talkburst since the end of the previous talkburst on an uplink.

Figure 2:
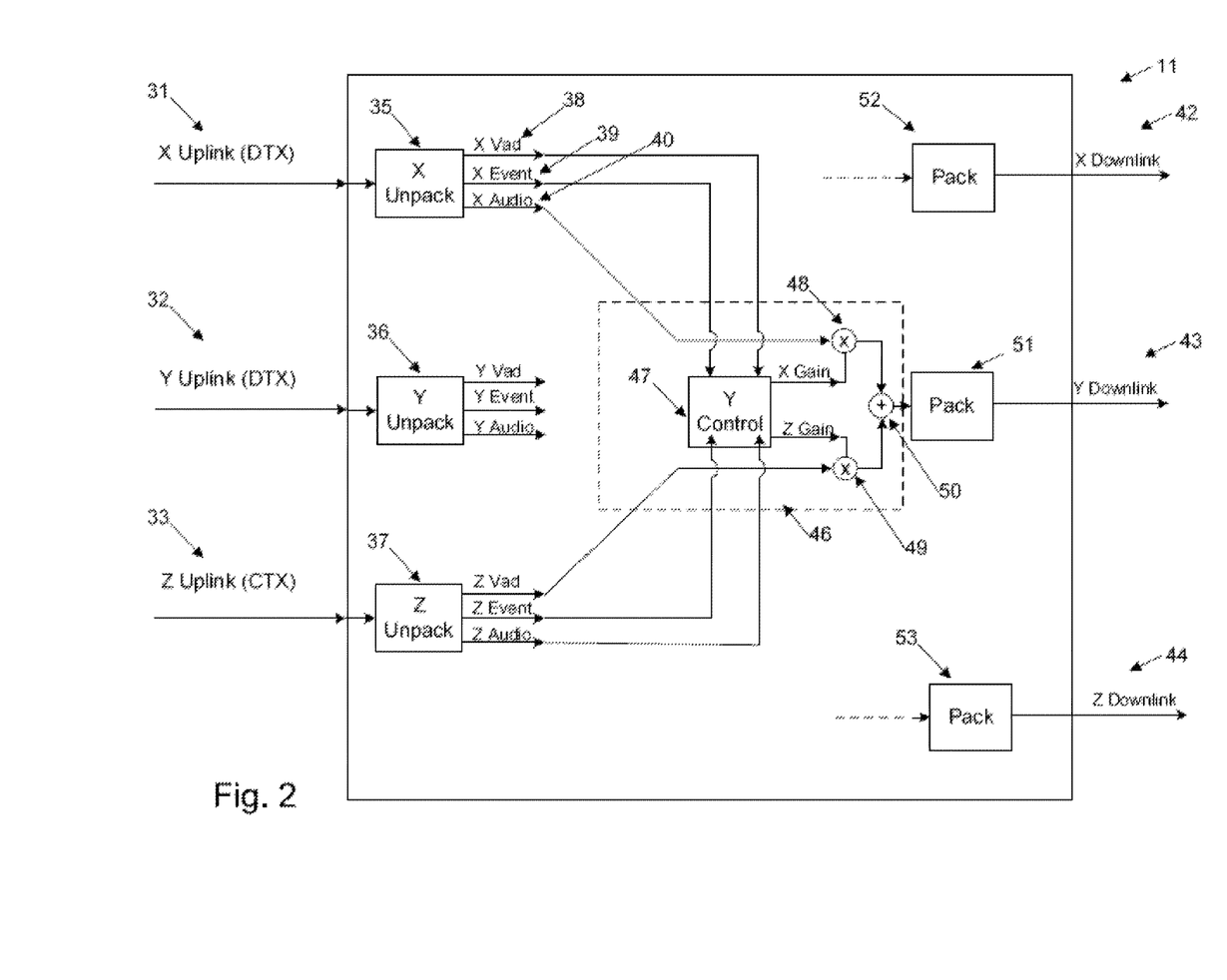
FIG. 2 illustrates the teleconference mixer of the preferred embodiment.

Whilst the mixer manages teleconference calls on demand, FIG. 2 illustrates schematically one form of teleconferencing mixer 11. A plurality of uplink streams, some DTX (31, 32), some CTX (33), are asserted to the mixer 11. Each of the uplink streams passes through an unpack unit 35, 36, 37. Depending on the uplink encoding information, the unpack unit unpacks the uplink stream and extracts the VAD 38, masking event information and audio information 40 from the uplink stream, and to identify masking events 39 as described below. The mixer produces a plurality of downlink streams 42, 43, 44. Shown in the figure is the mixing apparatus 46 associated with downlink 43. Not shown is similar apparatus which exists for each of the other downlinks 42, 44. The mixing control unit 11 for this downlink operates on the VAD and masking event signals produced by the unpack units 35, 37 associated with the other downlinks and produces a gain for each of the uplinks other than uplink 36, because downlink 43 will be heard by the same endpoint Y that generated uplink 32. These gains are used to scale 48, 49 and mix 50 the audio from the uplinks to produce a final audio stream suitable for repacking and encoding 51 back through the downlink 43.

In this preferred embodiment, the masking event output e.g. 39 of the corresponding unpack unit e.g. is asserted for a short period (for example 20 ms) when the corresponding VAD signal transitions from low (no speech detected) to high (speech detected) after being low for a period exceeding threshold $\Delta T_{event}$, which for example could be set to 10 seconds.

The behavior of the control unit 47 with respect to DTX uplinks (e.g. 31) is to set the corresponding gain to 1 whenever the associated VAD signal is high. That is, DTX endpoints are mixed into the downlink whenever they are sending speech. The behavior of the control unit with respect to CTX endpoints 33 is to deassert an internal trigger signal whenever the amount of time that has elapsed since the VAD flag of the corresponding uplink was high exceeds the threshold $\Delta T_{trigger}$, which for example could be set at 60 seconds. The trigger signal is asserted whenever the corresponding VAD flag is high. When the trigger signal is deasserted, the control unit waits until the masking event signal corresponding to any of the other endpoints is asserted before applying a transition, which in the case of this preferred embodiment involves slewing down gain from 1 to 0 of the CTX endpoint over a an amount of time $\Delta T_{transition}$, which for example could be set to 3 seconds.

EXAMPLES AND ILLUSTRATIONS

Figure 3:
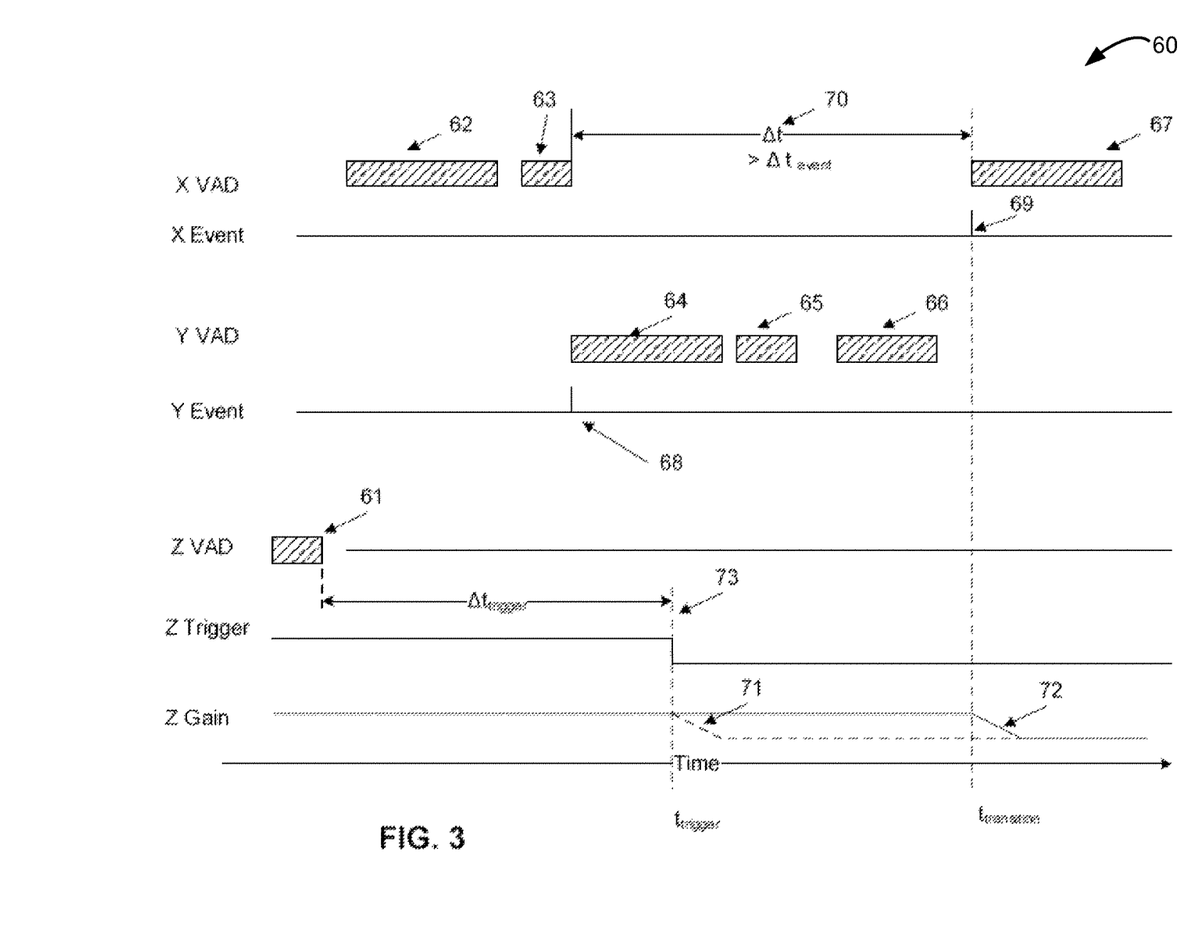
FIG. 3 illustrates a timeline of example sequence of operations of the teleconference mixer of the preferred embodiment.

FIG. 3 illustrates an example of a timeline 60 of operations for the embodiment described above. The sequence starts with CTX endpoint Z finishing a talkburst 61. After this, two talkbursts 62, 63 are detected from endpoint X. Y now talks for a time and three talkbursts 64, 65 and 66 are detected after which X talks again 67. At time $t_{trigger}$ a trigger event 73 occurs because no speech has been detected from CTX endpoint Z for a period exceeding $\Delta T_{trigger}$. The control unit is now in a state where it will begin a transition upon the next instance of a masking event, instead of fading out immediately 71. A masking event 68 occurs when Y begins talking 64, but this is of no significance to the control unit, because it occurs before the trigger and because the mixer is currently servicing the downlink for the endpoint Y in question. When X recommences talking 67 after a period of silence 70 longer than $\Delta T_{event}$, a second event is signalled 69 upon receipt of which the control unit starts the transition, fading uplink Z out 72 in downlink Y over a number of seconds.

Figure 4A:
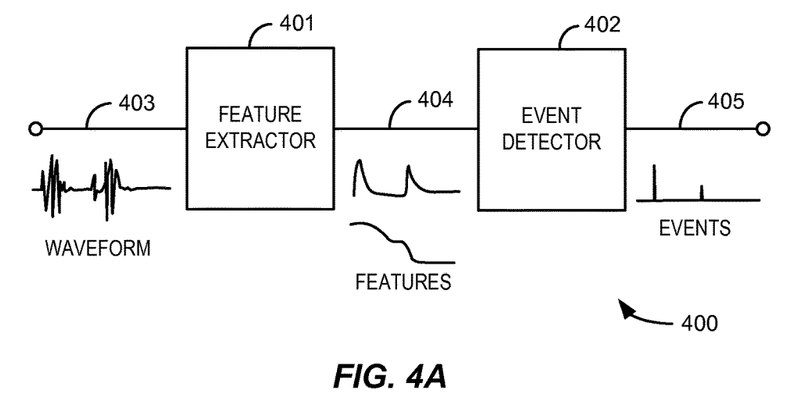
FIG. 4A is a block diagram that shows examples of elements of a system for determining events from audio waveforms.

FIG. 4A is a block diagram that shows examples of elements of a system for determining events from audio waveforms. The types and numbers of components shown in FIG. 4A are merely shown by way of example. Alternative implementations may include more, fewer and/or different components. The system 400 may, for example, be an instance of, or a component of, a teleconferencing mixer such as the teleconferencing mixer 11 shown in FIG. 2 and described above. In some implementations, the system 400 may be a component of a teleconferencing server, e.g., a line card. However, as described in more detail below with reference to FIGS. 6A-6C, in some implementations the functionality of the system 400 may be implemented, at least in part, by one or more telephone endpoints. The system 400 may be implemented, at least in part, by a control system that may include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components. In some implementations, the system 400 may be implemented according to instructions (e.g., software) stored on one or more non-transitory media. Such non-transitory media may include memory devices such as those described herein, including but not limited to random access memory (RAM) devices, read-only memory (ROM) devices, etc.

In the example shown in FIG. 4A, the system 400 includes a feature extractor 401 and an event detector 402. Here, the feature extractor 401 is shown receiving input waveforms 403. In some examples, the waveforms 403 may correspond to speech and/or background noise. The waveforms 403 may vary according to the particular implementation. For example, if the feature extractor 401 is implemented in a teleconferencing mixer, a teleconferencing server, or a similar device, the waveforms 403 may be unpacked and decoded waveforms from an uplink stream. However, if the feature extractor 401 is implemented in a telephone endpoint, the waveforms 403 may be raw microphone signals or pre-processed microphone signals.

In this implementation, the feature extractor 401 is capable of analysing input waveforms 403 and producing output corresponding to one or more types of features 404. Some examples are shown in FIG. 4B and are described below.

In this example, the event detector 402 is capable of analysing the features 404 and producing output corresponding to one or more types of events 405. In some implementations, the events 405 may be masking events as disclosed elsewhere herein. Accordingly, in some examples the events 405 may correspond with the onset of speech, the cessation of speech, the presence of particular syllables, words or classes of speech, changes in the volume level, spectral flux, or other such heuristics, and/or criteria determined according to auditory scene analysis. In some implementations, the output of the event detector 402 may be "binary," indicating only whether an event is, or is not, present. However, in some examples, the output of the event detector 402 also may indicate an event magnitude, e.g., as described above.

Figure 4B:
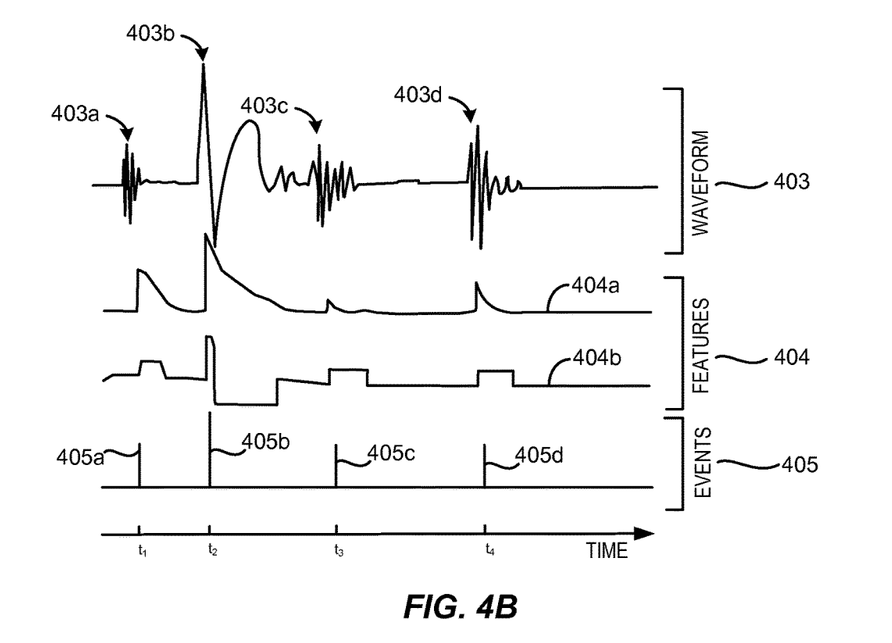
FIG. 4B shows examples of input waveforms and corresponding features and events that may be generated by a system such as that shown in FIG. 4A.

FIG. 4B shows examples of input waveforms and corresponding features and events that may be generated by a system such as that shown in FIG. 4A. In this example, the feature extractor 401 is capable of analysing input waveforms 403 and producing output corresponding to changes in level and changes in the pitch. Accordingly, in the example shown in FIG. 4B the features 404a correspond with changes in the level of the waveforms 403, whereas the features 404b correspond with changes in the pitch of the waveforms 403.

In this example, the event detector 402 has detected events 405a-405d at times $t_1$-$t_4$, which correspond with the waveform portions 403a-403d, respectively. According to this example, the output of the event detector 402 indicates an event magnitude, which is indicated by the length of the lines shown in FIG. 4B corresponding with the events 405a-405d. For example, the event 405a has a smaller magnitude than the event 405b. In this example, the event detector 402 has detected the events 405a-405d at times corresponding with significant changes (e.g., changes that are at or above predetermined thresholds) in both the level and the pitch of the waveforms 403.

Figure 5A:
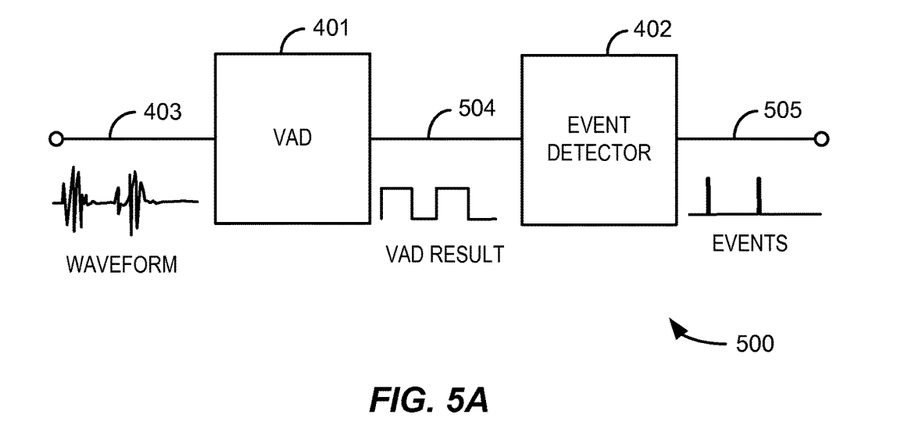
FIG. 5A is a block diagram that shows examples of elements of an alternative system for determining events from audio waveforms.

FIG. 5A is a block diagram that shows examples of elements of an alternative system for determining events from audio waveforms. The types and numbers of components shown in FIG. 5A are merely shown by way of example. Alternative implementations may include more, fewer and/or different components. The system 500 may, for example, be an instance of, or a component of, a teleconferencing mixer such as the teleconferencing mixer 11 shown in FIG. 2 and described above. In some implementations, the system 500 may be a component of a teleconferencing server, e.g., a line card. However, as described in more detail below with reference to FIGS. 6A-6C, in some implementations the functionality of the system 500 may be implemented, at least in part, by one or more telephone endpoints. The system 500 may be implemented, at least in part, by a control system that may include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components. In some implementations, the system 500 may be implemented according to instructions (e.g., software) stored on one or more non-transitory media. Such non-transitory media may include memory devices such as those described herein, including but not limited to random access memory (RAM) devices, read-only memory (ROM) devices, etc.

In the example shown in FIG. 5A, the system 500 includes a feature extractor 401 and an event detector 402. In this implementation, the feature extractor 401 is capable of functioning as a voice activity detector (VAD). Accordingly, in this example the features output by the feature extractor 401 include VAD results 504. As described below with reference to FIG. 5B, in this example the event detector 402 is capable of detecting the events 505 according to a different methodology than that described above with reference to FIGS. 4A and 4B.

Figure 5B:
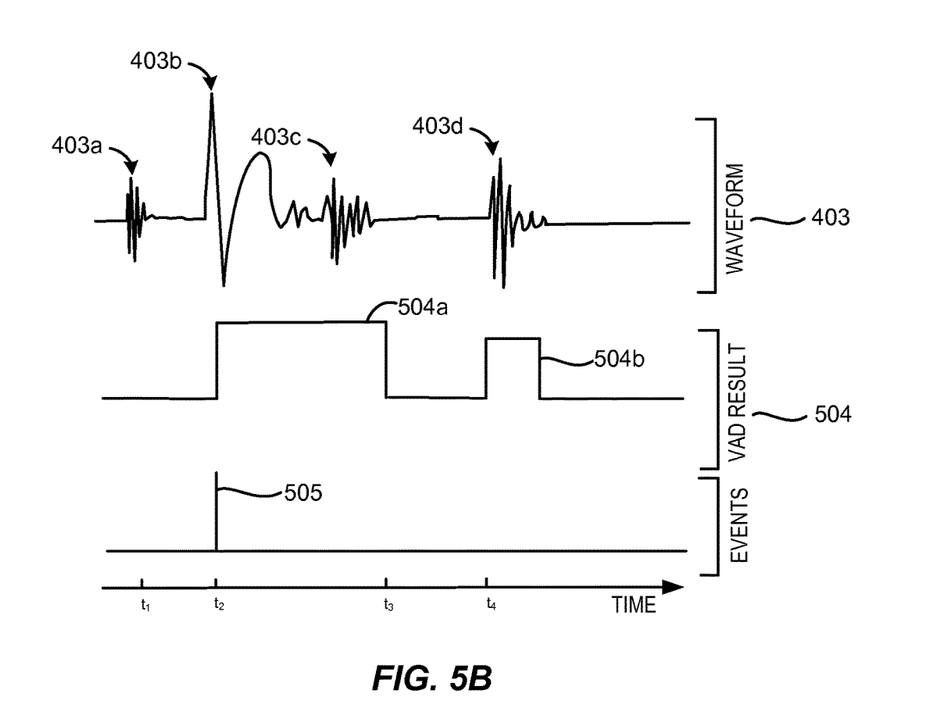
FIG. 5B shows examples of features that may be extracted and events that may be detected by a system such as that shown in FIG. 5A.

FIG. 5B shows examples of features that may be extracted and events that may be detected by a system such as that shown in FIG. 5A. In the example shown in FIG. 5B, the same input waveforms 403 shown in FIG. 4B are input to the feature extractor 401. In this implementation, the feature extractor 401 determines that the waveform portion 403a does not correspond to speech, but instead corresponds to background noise. Therefore, a negative VAD result is output at time $t_1$. Here, the feature extractor 401 outputs a VAD result 504a corresponding to the waveform portions 403b and 403c, beginning at time $t_2$ and extending to time $t_3$. According to this example, the feature extractor 401 outputs a VAD result 504b, beginning at time $t_4$, that corresponds to the waveform portion 403d.

In this example, the event detector 402 is capable of determining events that correspond with an onset of speech after a predetermined time interval of non-speech. The predetermined time interval of non-speech may vary according to the implementation. For example, in some implementations the predetermined time interval of non-speech may be 2 seconds, 3 seconds, 5 seconds, 10 seconds, 15 seconds, 20 seconds, 30 seconds, 60 seconds, etc. According to some implementations, the predetermined time interval of non-speech may correspond with $\Delta T_{trigger}$, which is described above with reference to FIG. 2.

In this example, the event detector 402 detects only a single event 505. In this instance, the event detector 402 outputs binary events. According to this example, the event detector 402 does not detect an event at time $t_1$ because the feature extractor 401 has determined that the waveform portion 403a does not correspond to speech and therefore no VAD result was output at time $t_1$. In this implementation, the event detector 402 detects an event 505 at time $t_2$, corresponding with the beginning of the VAD result 504a, because this feature corresponds to an onset of speech after a predetermined time interval of non-speech. In this example, the predetermined time interval of non-speech is greater than the time interval between time $t_3$ and time $t_4$. Therefore, the event detector 402 does not detect an event at time $t_4$, corresponding with the beginning of the VAD result 504b, because this feature corresponds to an onset of speech after a time interval of non-speech that is shorter than the predetermined time interval of non-speech.

Figure 6A:
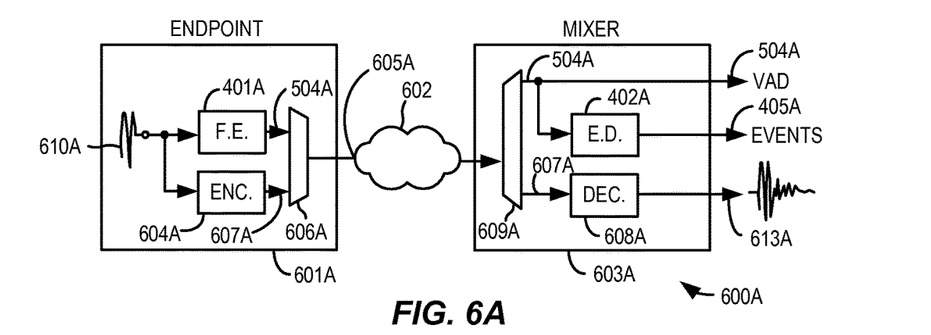
FIGS. 6A-6C show different system topologies for implementing feature extractors and event detectors.
Figure 6B:
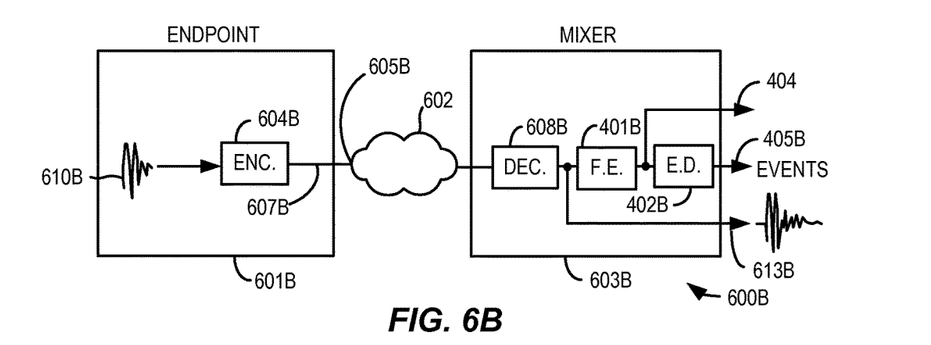
Figure 6C:
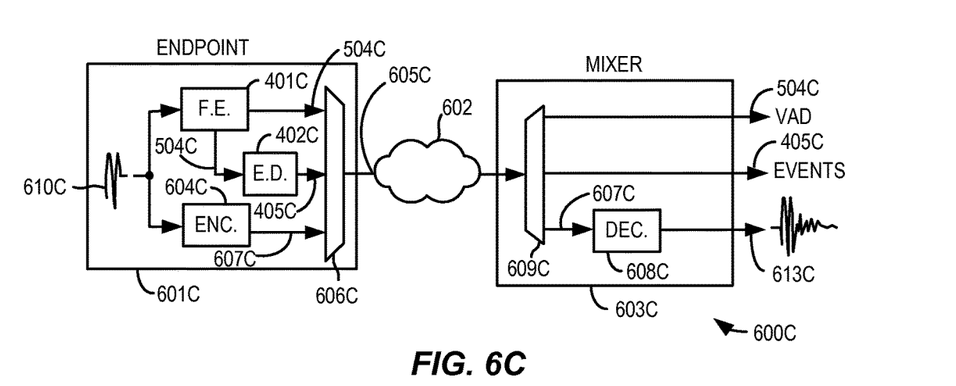

FIGS. 6A-6C show different system topologies for implementing feature extractors and event detectors. The types and numbers of components shown in FIGS. 6A-6C are merely shown by way of example. Alternative implementations may include more, fewer and/or different components. The systems 600A-600B may be implemented, at least in part, by control systems that may include one or more general purpose single- or multi-chip processors, digital signal processors (DSPs), application specific integrated circuits (ASICs), field programmable gate arrays (FPGAs) or other programmable logic devices, discrete gates or transistor logic, and/or discrete hardware components. In some implementations, the systems 600A-600B may be implemented according to instructions (e.g., software) stored on one or more non-transitory media. Such non-transitory media may include memory devices such as those described herein, including but not limited to random access memory (RAM) devices, read-only memory (ROM) devices, etc.

In the examples shown in FIGS. 6A-6C, the systems 600A-600C include telephone endpoints 601A-601C and unpack units 603A-603C. Each of the unpack units 603A-603C may, in some implementations, have functionality similar to one of the unpack units 35-37 that are described above with reference to FIG. 2. The unpack units 603A-603C may be part of a teleconferencing mixer such as those disclosed elsewhere herein. The telephone endpoints 601A-601C may include one or more microphones (not shown) for converting sound into input waveforms.

According to the implementation shown in FIG. 6A, the telephone endpoint 601A includes a feature extractor 401A and the unpack unit 603A includes an event detector 402A. In this example, the feature extractor 401A is capable of VAD functionality. Accordingly, the feature extractor 401A is capable of receiving the input waveforms 610A and outputting VAD results 504A to the multiplexer 606A. In this implementation, the audio encoder 604A is capable of encoding the input waveforms 610A and outputting encoded audio data 607A to the multiplexer 606A. Here, the multiplexer 606A is capable of combining the VAD results 504A and the encoded audio data 607A. The telephone endpoint 601A is capable of outputting an uplink stream 605A to the network 602.

In the example shown in FIG. 6A, the unpack unit 603A includes a demultiplexer 609A that is capable of receiving the uplink stream 605A and of separating the VAD results 504A from the encoded audio data 607A. In this implementation, the demultiplexer 609A is capable of outputting the VAD results 504A to the event detector 402A, which is capable of detecting and outputting the events 405A. Here, the demultiplexer 609A is capable of outputting the encoded audio data 607A to the decoder 608A, which is capable of decoding the audio data 607A and outputting decoded audio data 613A.

In the example shown in FIG. 6B, the system 600B includes a telephone endpoint 601B and an unpack unit 603B. According to this implementation, the telephone endpoint 601B includes an audio encoder 604B that is capable of encoding the input waveforms 610B and outputting encoded audio data 607B, which is provided in the uplink stream 605B to the network 602.

In the example shown in FIG. 6B, the unpack unit 603B includes a decoder 608B, which is capable of decoding the uplink stream 605B and outputting decoded audio data 613B. In this implementation, the unpack unit 603B includes a feature extractor 401B, which is capable of receiving the decoded audio data 613B and extracting the features 404. In this example, the feature extractor 401B is capable of outputting the features 404 to the event detector 402B, which is capable of detecting and outputting the events 405B.

According to the implementation shown in FIG. 6C, the telephone endpoint 601C includes a feature extractor 401C and an event detector 402C. In this example, the feature extractor 401C is capable of VAD functionality. Accordingly, the feature extractor 401C is capable of receiving the input waveforms 610C and outputting VAD results 504C to the multiplexer 606C and to the event detector 402C. In this implementation, the audio encoder 604C is capable of encoding the input waveforms 610C and outputting encoded audio data 607C to the multiplexer 606C. In this example, the event detector 402C is capable of detecting events 405C, based on the VAD results 504C, and of outputting the events 405C to the multiplexer 606C. Here, the multiplexer 606C is capable of combining the VAD results 504C, the events 405C and the encoded audio data 607C, all of which are provided to the network 602 in the uplink stream 605C.

In the example shown in FIG. 6C, the unpack unit 603C includes a demultiplexer 609C that is capable of receiving the uplink stream 605C and of separating the VAD results 504C and the events 405C from the encoded audio data 607C. In this implementation, the demultiplexer 609C is capable of outputting the encoded audio data 607C to the decoder 608C, which is capable of decoding the encoded audio data 607C and outputting decoded audio data 613C.

CONCLUSION

It will therefore be evident that the preferred embodiments provide a method and system for masking audio conference transitions by monitoring the audio environment for a suitable trigger and delaying the transitions until such time as the trigger occurs.

Interpretation

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic or optical signal, or any suitable combination thereof.

A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired line, optical fiber cable, RF, etc., or any suitable combination of the foregoing.

Computer program code for carrying out operations for aspects of the present application may be written in any combination of one or more programming languages, including an object oriented programming language such as Java, Smalltalk, C++ or the like and conventional procedural programming languages, such as the "C" programming language or similar programming languages. The program code may execute entirely on the user's computer as a stand-alone software package, or partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the description provided herein, numerous specific details are set forth. However, it is understood that embodiments of the invention may be practiced without these specific details. In other instances, well-known methods, structures and techniques have not been shown in detail in order not to obscure an understanding of this description.

While there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. In an audio conferencing mixing system of the type taking a plurality of audio input streams of input audio information of conference participants, including mixing transition events and outputting a plurality of audio output streams including output audio information, a method of mixing the audio input streams, the method including the steps of:
   (a) determining that a transition event is to occur, wherein the transition event is a change to the mixing of the audio input streams, the change comprising turning on/off or fading in/out, in at least one of the audio output streams, an audio input stream of the plurality of audio input streams;
   (b) determining that a masking event is to occur in one of the audio input streams, wherein the masking event is an event that, if it occurs when the transition event occurs, the transition event is not noticeable to the listening participant due to the effect of the masking event; and
   (c) scheduling the transition event to substantially occur when the masking event occurs, wherein said scheduling the transition event comprises delaying the occurrence of the transition event until the masking event occurs.

2. A method as claimed in claim 1 wherein said masking event includes the onset or cessation of speech in one of said audio input streams.

3. A method as claimed in claim 2, wherein said onset or cessation of speech is denoted by a change in value of a voice activity flag in one of said audio input streams.

4. A method as claimed in claim 1 wherein the masking event comprises the utterance of predetermined text by at least one of the conference participants.

5. A method as claimed in claim 1 wherein the presence of an increase in volume and/or predetermined spectral flux in one of the audio input streams is indicative of a masking event in said one of the audio input streams.

6. A method as claimed in claim 1 wherein the masking event is determined by an auditory scene analysis of the series of audio input streams.

7. A method as claimed in claim 1 wherein the audio input streams include at least one CTX (continuous transmission) audio input stream and at least one DTX (discrete transmission) audio input stream.

8. An audio mixing system configured to perform the method of claim 1.

9. A tangible, non-transitory computer-readable medium carrying computer-interpretable instructions which, when executed by a processor of an apparatus for use in a teleconference mixing system, the apparatus being configured to receive a plurality of audio input streams and to produce at least one audio output stream based on the audio input streams, causes the apparatus to carry out the method of claim 1.

* * * * *